(No Model.)
R. A. ROBERTS.
AIR MOISTENER.
No. 364,136. Patented May 31, 1887.
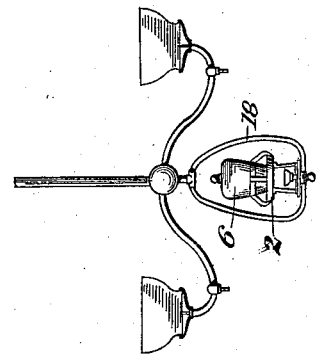
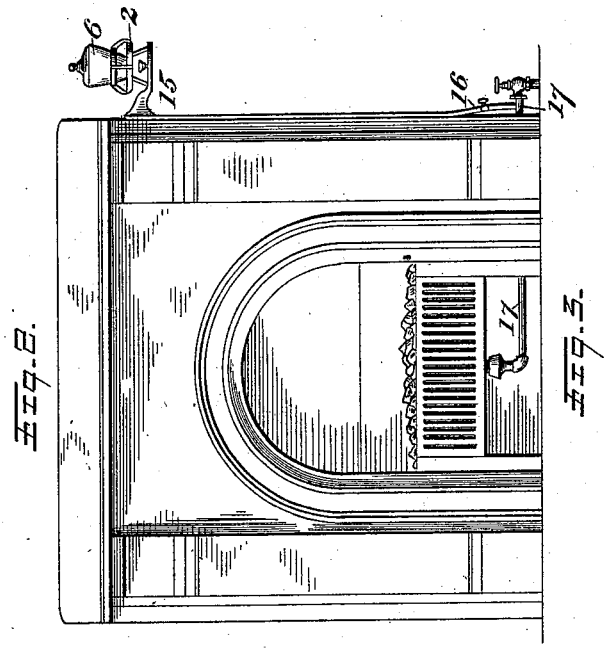
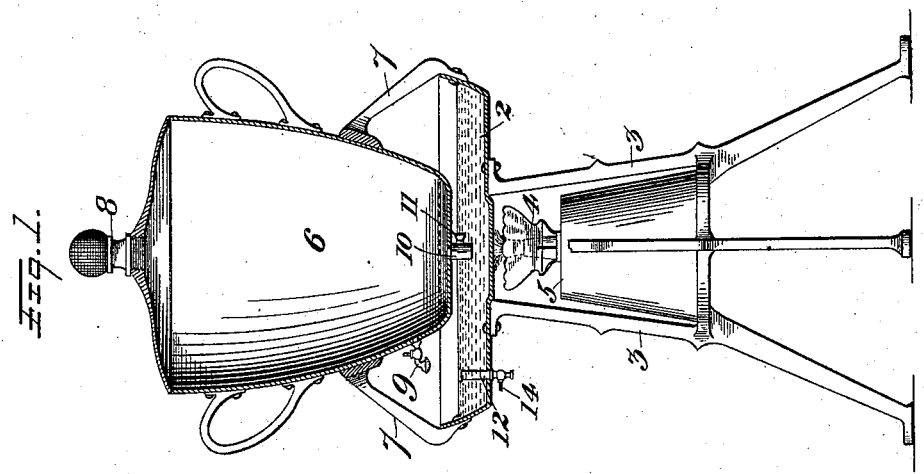
Witnesses
J. H. Bakewell
W. B. Corwin
Inventor
Richard A. Roberts
By his Attorneys
Bakewell & Kerr

UNITED STATES PATENT OFFICE.

RICHARD A. ROBERTS, OF PITTSBURG, PENNSYLVANIA.

AIR-MOISTENER.

SPECIFICATION forming part of Letters Patent No. 364,136, dated May 31, 1887.

Application filed November 23, 1886. Serial No. 219,622. (No model.)

*To all whom it may concern:*

Be it known that I, RICHARD A. ROBERTS, of Pittsburg, in the county of Allegheny and State of Pennsylvania, have invented a new and useful Improvement in Air-Moisteners; and I do hereby declare the following to be a full, clear, and exact description thereof.

The use of natural gas as a fuel for heating purposes makes it very desirable to employ some efficient means for moistening the atmosphere of houses in which the gas is used for sanitary purposes and to prevent the dry heat of the gas from warping or cracking the woodwork and furniture. The devices heretofore commonly used for this purpose have been pots or vessels of water suspended in front of the fire-place; but these are generally inefficient, because the amount of vapor generated by the heat is small, and it is apt to be drawn up the chimney by the draft of the flue, and not to be distributed through the atmosphere of the room. To prevent this, I have devised a peculiar vaporizing apparatus, which is adapted to be set in a room out of the range of the draft of the fire-place, so that all the vapor generated may be utilized in moistening the atmosphere.

My invention consists in a shallow open water-pan of comparatively large area exposed to the atmosphere, in combination with a water feeder or reservoir, preferably of greater capacity than the pan, for supplying water to the latter, together with means for heating and vaporizing the water contained in the pan.

It also consists in certain details of construction of these parts, which I shall hereinafter describe, and shall specifically indicate in the claims.

The invention is illustrated in the accompanying drawings, in which—

Figure 1 is a central vertical section of the water pan and reservoir shown mounted upon a stand above an alcohol-lamp. Fig. 2 shows the apparatus when the heat is supplied by a gas-jet tapped from the supply-pipe of a fire-place. Fig. 3 shows the apparatus applied to an illuminating-chandelier and deriving heat from a gas-jet tapped from the chandelier supply-pipe.

Like symbols of reference indicate like parts in each.

In the drawings, (see Fig. 1,) 2 represents the vaporizing-pan, which may be made of any suitable material, preferably of copper, granite-iron, porcelain, or some other non-corrodible substance. It is of quite large diameter— say from eight to fifteen inches—so as to present a large evaporating area, and is set upon the top of a tripod or stand, 3. A lamp, 4, arranged upon a shelf, 5, of the tripod beneath the pan, supplies the necessary heat to vaporize the water. The water-reservoir consists of an urn or pot, 6, which is supported by standards 7, projecting upward from the pan. It is preferably a closed vessel, except that at the top there is a hole for the introduction of water. This hole is closed by a removable screw-plug, 8. Near the base of the urn there is a spigot, 9, provided with a cock, through which water may be drawn from the urn into the pan below. When the lamp is lighted, its heat vaporizes the water in the pan 2, and as the water is thus used it may be replaced from time to time by drawing a supply from the urn through the spigot 9; or the cock may be left open and so adjusted that just enough water may drip into the pan to supply the loss by evaporation. When the spigot 9 is used to feed the pan, the urn should be left open at the top to permit the entrance of air. This may be done either by removing the plug 8, or the whole cover of the urn may be made removable. I, however, show an additional means of feeding the pan with water automatically, which may either be used alone or as an adjunct of the spigot device just described. It consists of a pipe or tube, 10, which extends down from the bottom of the urn into the pan. When the urn is tightly sealed and the pipe 10 left open, water will flow from the urn into the pan until the level of water in the latter rises above the open lower mouth of the tube. Then, according to the laws regulating a vacuum, the mouth of the tube being sealed, no more water can escape from the urn until by evaporation the level of water in the pan is again reduced below the tube. Water then flows through the latter, and so the level of water in the pan is kept constant. When this device is used, it is necessary to provide means for closing the tube 10 while the urn is being filled with water, since otherwise when the plug 8 is removed the water would flow out freely from the tube. To prevent this I provide the tube with a cock, 11, which should be closed before the urn is filled.

The pan 2 may be used not only for vaporizing water, but also for heating water for domestic purposes. For this purpose I provide the pan with a tube, 12, which projects through the bottom and extends up somewhat above the level of the bottom of the pan. This tube is provided with a cock, 14, and is preferably perforated or covered with a wire grating at the top, so as to screen off the floating impurities at the surface of the water. By reason of the elevation of the end of the tube above the pan-bottom in drawing off the hot water through this tube the sediment at the bottom of the pan is undisturbed.

The apparatus can be made very ornamental in appearance by proper selection of materials of which the parts are made. A good effect is produced by setting a shade of colored glass around the flame of the lamp 2.

The form of my invention which I show in Fig. 1 is designed to be movable from one place to another, the fuel supplying the heat being preferably alcohol, because it makes no smoke and no disagreeable odor.

In Fig. 2 I show the same apparatus arranged for use with gas as a fuel. The stand 3, which supports the pan and the urn, is mounted upon a bracket, 15, which projects from the side of the fire-place jamb, and a gas-pipe, 16, which leads from the supply-pipe 17 of the fire-place, extends along or through the bracket, and terminates in a burner (preferably of the Bunsen pattern) underneath the pan 2.

In Fig. 3 the apparatus is shown in connection with a chandelier, the stand 3 being supported by a hanger, 18, which depends from the base of the chandelier. One or both of the arms of the hanger are hollow and serve to convey gas to the burner, which is arranged underneath the pan in the same manner as shown and described with reference to Fig. 2.

The apparatus is of great use, not only on account of its ornamental appearance, but also because, by means of the vaporizing-pan 2, I secure a large area of water exposed to the heat and to the atmosphere, so that the evaporation takes place rapidly and without the necessity of using anything but a small quantity of fuel, while the urn 6 may be made of such size as to keep the apparatus in continuous and automatic operation for a considerable length of time.

I claim—

1. In an air-moistener, the combination of the evaporating-pan 2, a closed water-reservoir situate above the pan, a supply-pipe, 10, extending from the reservoir into the pan, and a burner situate immediately below said evaporating-pan, substantially as and for the purposes described.

2. In an air-moistener, the combination of the open evaporating-pan 2, the water-reservoir 6, situate above said pan, arms 7, extending above the pan and supporting the reservoir, a stand, 3, supporting the pan, and a burner, 4, situate immediately below the pan, substantially as and for the purposes described.

3. In an air-moistener, the combination of the evaporating-pan 2, a closed water-reservoir situate above the pan, a supply-pipe, 10, extending from the reservoir into the pan, a burner situate immediately below said evaporating-pan, a removable cap or plug, 8, and a cock, 11, controlling the tube 10, whereby on removing the cap or plug and closing the cock the reservoir may be filled, substantially as and for the purposes described.

In testimony whereof I have hereunto set my hand this 9th day of November, A. D. 1886.

RICHARD A. ROBERTS.

Witnesses:
W. B. CORWIN,
H. L. GILL.